United States Patent [19]

Hayden

[11] Patent Number: 4,758,335

[45] Date of Patent: Jul. 19, 1988

[54] CONTAMINATED WATER DISPOSAL SYSTEM

[76] Inventor: James M. Hayden, Rte. 1, Box 70, Blythe, Calif. 92225

[21] Appl. No.: 832,025

[22] Filed: Feb. 24, 1986

[51] Int. Cl.⁴ ............................................. B01D 36/00
[52] U.S. Cl. ...................... 210/90; 210/104; 210/171; 210/180; 210/195.1; 210/251; 210/257.1; 210/295
[58] Field of Search ............... 210/769, 90, 104, 137, 210/171, 172, 180, 181, 195.1, 251, 257.1, 258, 295

[56] References Cited

U.S. PATENT DOCUMENTS 3,650,403  3/1972  Aldridge ...................... 210/769 X
4,321,151  3/1982  McMullen ........................ 210/769
4,330,411  5/1982  Florin et al. .................... 210/769
4,581,144  4/1986  Marchesi ..................... 210/769 X Primary Examiner—Tom Wyse
Attorney, Agent, or Firm—Ralph S. Branscomb

[57] ABSTRACT

A system is provided for washing down equipment, aircraft and vehicles used in the application of pesticides on crops, and accumulating the wash water with its dissolved contaminants. The wash water is passed through an activated charcoal filter to remove the contaminants, and the filtered water is then converted to steam, which is also run through a second activated charcoal filter so that, with the double filtration system, only pure steam is vented into the atmosphere.

7 Claims, 2 Drawing Sheets

4,758,335

CONTAMINATED WATER DISPOSAL SYSTEM

BACKGROUND OF THE INVENTION

As chemical dumping becomes an increasing concern of the Environmental Protection Agency, and state and county air and water control board, the problem of pollution is becoming less of a general problem to the world community as a whole, and more of an onus borne directly by those engaged in activities for the benefit of society, but which utilize toxic material Specifically, federal, state, and local rules for the disposal of wastes which are considered to be toxic can be extremely onerous and expensive on the small businessman. It may cost $2,000.00 or more to have even one 55-gallon drum of so-called toxic material hauled to a disposal site, and the list of materials and their concentrations that are considered toxic gets longer and longer.

For example, wash water from crop dusting planes is considered a hazardous waste because of the residue of crop-dusting chemicals that settles on the plane, and such wash water must be disposed of at a toxic waste dump, at least under the Environmental Protection Laws of all or part of California. The fact that the pesticide residue which is considered hazardous waste when washed from an airplane is the exact same residue that is deliberately put on edible crops and thus could not possibly be particularly toxic, does not affect the fact that such wash water is considered toxic and if the airplanes and equipment are ever to be washed, some provisions must be made to dispose of the wash water.

It is clearly impractical to put the wash in rinse water from crop dusting airplanes and other equipment in 55-gallon drums and pay thousands of dollars to have it shipped to a toxic waste dump every time an airplane or other piece of equipment is washed. There is a need for either disposing of the wash water on site in an environmentally sound manner, or at least consolidating the wash water from its extremely dilute level of contamination, which might be on the order of several parts per billion into a more concentrated form, which might be accumulated for a period of time, so that only occasional trips to a toxic waste dump are required, vastly reducing the cost of disposing of such wastes.

SUMMARY OF THE INVENTION

The instant invention provides a solution to the above-stated problems in the way of a washing system utilized to wash aircraft, vehicles, and other equipment which may been involved directly or indirectly, and the crop dusting or "aerial application" business, or in any other matter involved with the application of pesticides to crops.

The system as described and claimed herein utilizes a concrete platform with a radiused rim which drains into a sump at one corner. The sump is double-lined to positively prevent seepage of a toxic waste material into the soil, and the integrity of the double lining is constantly monitored.

The actual system for disposal of the wash water constitutes an intake line which draws water from the sump as it accumulates above a certain level, forces the "contaminated" water through an activated charcoal filter into a boiler. The water, after having passed through the charcoal filter, should be free of contaminants, is then boiled off, and the steam produced is then run through a second activated charcoal filter to make absolutely sure none of the contaminants pass into the atmosphere.

Any condensate from the steam is accumulated and recycled through the charcoal and boiler system, except for a small portion, which is continuously accumulated and collected into a sample jar, to be periodically inspected to ensure the cleanliness of the steam vented to the atmosphere.

DETAILED DESCRIPTION OF THE PREFERRED EMBODIMENT

Figure 1:
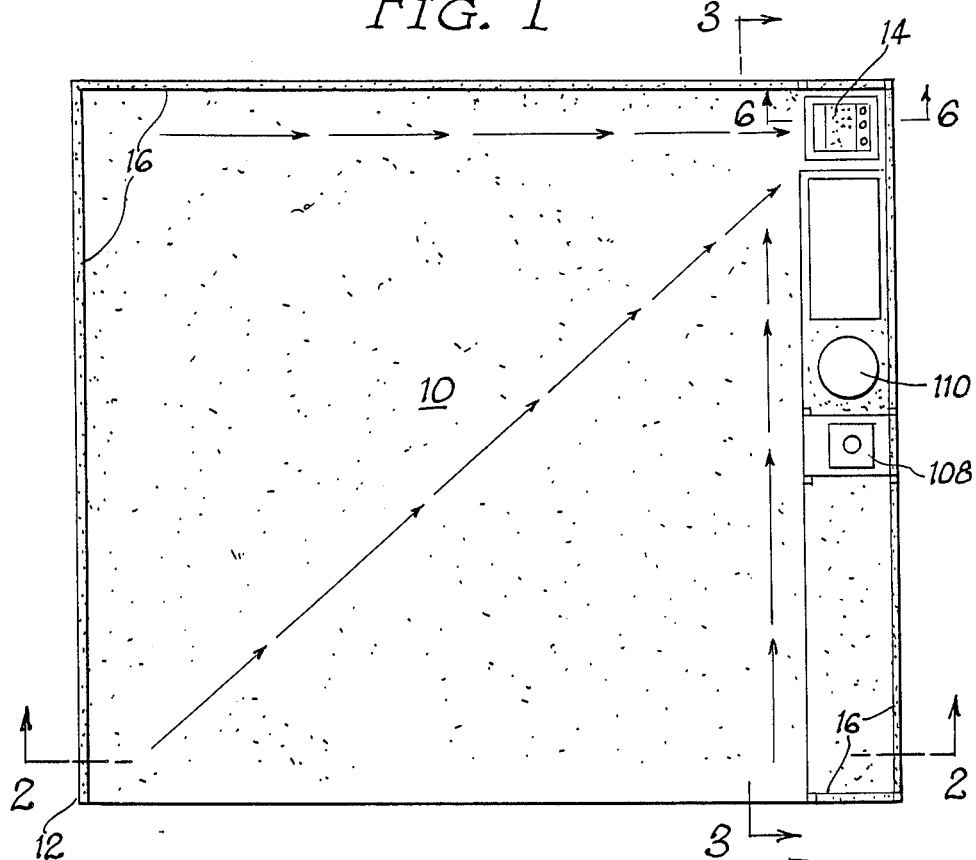
FIG. 1 is a top plan view of the entire system.
Figure 2:
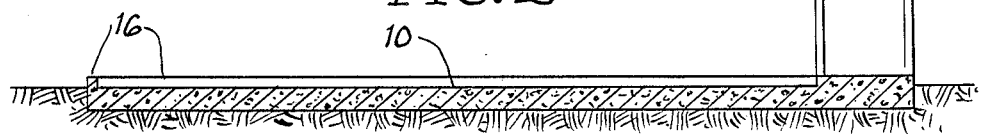
FIG. 2 is a side elevation view of the system of FIG. 1.
Figure 3:
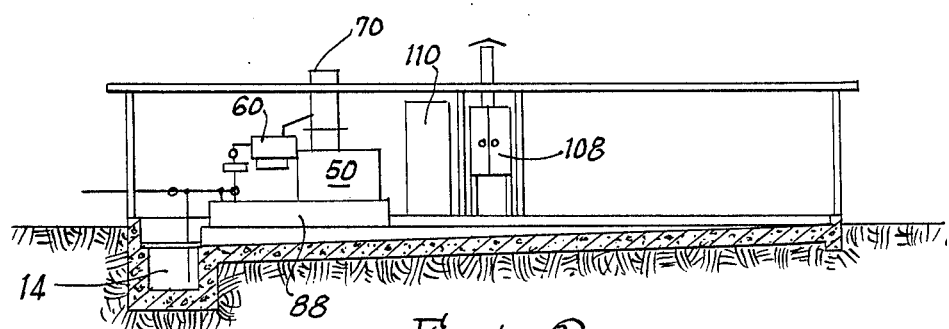
FIG. 3 is a front elevation view of the system, seen at 90 degrees from the view taken at FIG. 2.

The system includes a large platform 10, best seen in FIG. 1, which is large enough to accomodate a helicopter, prop plane, or vehicle for washing. The platform, which generally would be concrete, is elevated in one direction, and slopes down from the high corner 12 to the sump 14, at the lowest corner. The platform may be surrounded by a six-inch curb 16 or the equivalent to ensure that wash water does not roll off into the surrounding soil. On one side or one two opposite sides of the platform, the curb may be removable or omitted in its entirety, to permit the entrance of vehicles, or in the case of airplanes, permit them to roll onto one side of the platform and roll off the other, so they won't have to turn around, and they can find a space.

Figure 5:
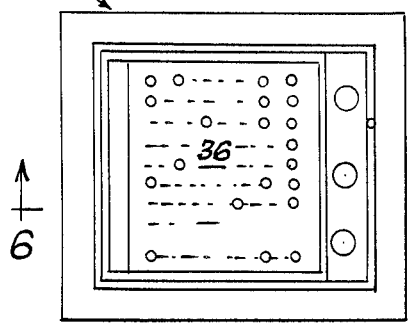
FIG. 5 is a top plan view of the sump.
Figure 6:
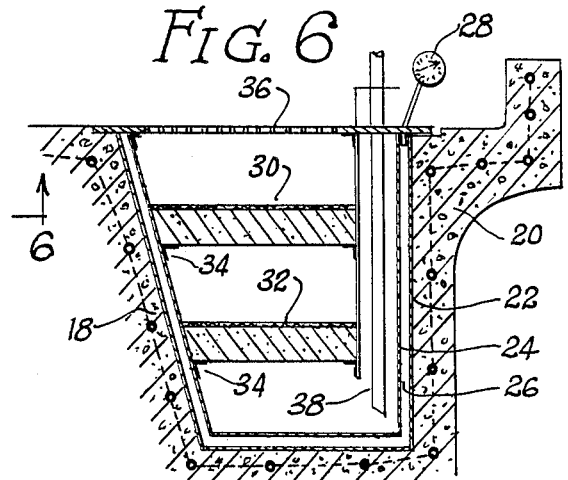
FIG. 6 is a section taken through the sump.

The sump is best detailed in FIGS. 5 and 6. To guarantee to the greatest extent possible that no contaminated water will seep into the soil, the sump is provided with a double lining. Both linings are stainless steel. The outer lining, indicated at 18, is made of a base of concrete 20, with the stainless steel lining indicated at 22. The inner stainless steel lining 24 is supported in any convenient fashion above and outside the outer lining 22 to define a chamber 26 between the two linings. This chamber is sealed, and communicates with a pressure gauge 28, and the gas in the chamber is maintained at a pressure higher than atmospheric so that a drop or rise in the pressure, as evidenced by the gauge 28, will reveal virtually instantly a disruption of the integrity of the double-lined sump so that a repair can be made before any substantial seepage of contaminants occurs.

Within the sump itself, a pair of hand-removable screens 30 and 32 rest on appropriate supports 34. These screens are of increasingly smaller gauge toward the bottom, and are effective in removing small gravel, sand, and tiny particulants from the wash water, so that essentially only dissolved contaminants remain. The top of the sump is protected by an apertured grate 36, which will prevent gravel and debris from entering the finer mesh screens lower in the sump.

A tube 38 extends down into the sump and draws "contaminated" water from the bottom of the sump up into the filtering and boiler system of the apparatus.

Figure 4:
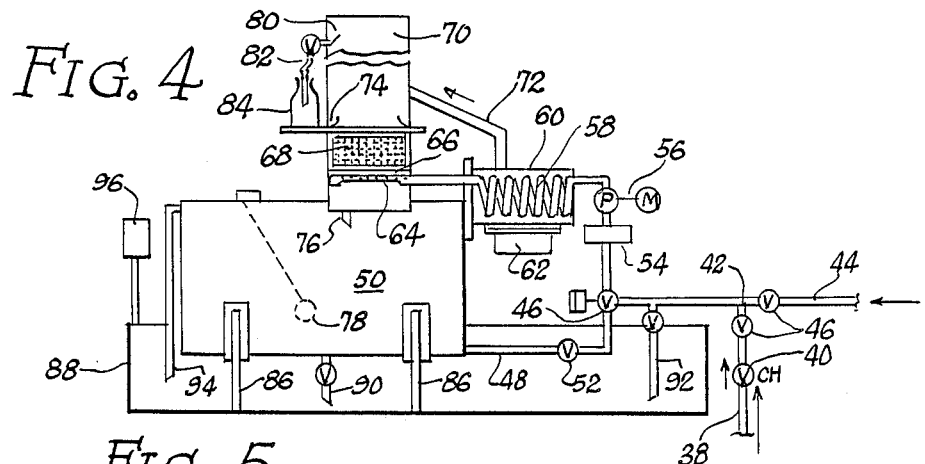
FIG. 4 is a diagrammatic view illustrating the way in which the preferred embodiment operates.

Referring now to FIG. 4, this tube is the upstream end of the intake line of the system. The system has a check valve at 40 to prevent reverse flow of water back into the sump. The intake line also includes a "T" joint at 42, so that the intake line and a fresh water flush line 44 connect. Valves 46 determine whether the system is in its normal filtering mode, or whether the sump line 38 is closed and the flush line 44 is opened to flush the system with fresh water.

The intake line passes the water from the sump up through a 3-way filtered valve 46. This 3-way valve ordinarily would permit the flow of the sump water up through the filter system, but also periodically could be switched to pump water through a recycle line 48 from the condensation collection tank 50. This line is also equipped with a check valve 52.

An activated charcoal filter 54 is interposed in the intake line, and the flow in the intake line is powered by the pump and motor indicated at 56. The pump introduces the water into the flash-boil coil 58 of the boiler 60 which is energized by a burner 62, which could be of the propane, natural gas or diesel variety. As it progresses through the coil 58, the water is turned into steam. The steam exits the boiler system through the jets 64 in the steam chamber 66. The bottom portion of the steam chamber receives the steam, and the path of escape for the steam is up through a second activated charcoal filter 68 into the stack region 70 of the steam chamber.

Steam such as that introduced into the stack area 70 of the steam chamber will largely remain in its gaseous state, but nonetheless some will tend to recondense into liquid form. To help keep the steam in its gaseous state, the spent exhaust gases from the boiler 60 are introduced into the stack through exhaust lines 72. Any steam that does condense on the side of the stack is accumulated in the collection collar 74, and pass through the drip tube 76 back into the collection 50, from whence they are recycled through the line 48. An automatic level sensor 78 inside the collection tank indicates when the accumulation of recycled water is sufficient to open the valve 52 in the return line, which may be effected automatically if desired.

In order to permit the periodic monitoring of the quality of the steam produced by the system, a small dam 80 is disposed in an upper region of the stack, which connects to a duct 82 leading to a specimen bottle 84. The specimen bottle will be removed periodically and taken off for testing, and replaced with a fresh bottle.

The entire system as thus described is suitably supported by braces 86, and sits in a surrounding collection pan or tank 88. This pan would not have any liquid in it under ordinary circumstances, except when the system is being flushed, at which point the valved drain line 90 would empty the flush water into the pan from which it is drawn out through the check valved line 92, back into the recycling system. In addition to this function, however, the pan is in essence a safety feature, to catch contaminated water in the case of some kind of leakage of the upper structure, and also acts as an overflow. The overflow line 94 will deliver water into the underlying pan in the event the level sensor 78 fails to actuate the pump 56 and the suitable valves 52 and 46 to draw the water out of the main tank for recyling.

The control panel 96, illustrated in FIG. 4, would ordinarily include an hour meter indicating the overall time the system has been in operation, an on/off pump override switch, and other suitable gauges and switches.

Figure 7:
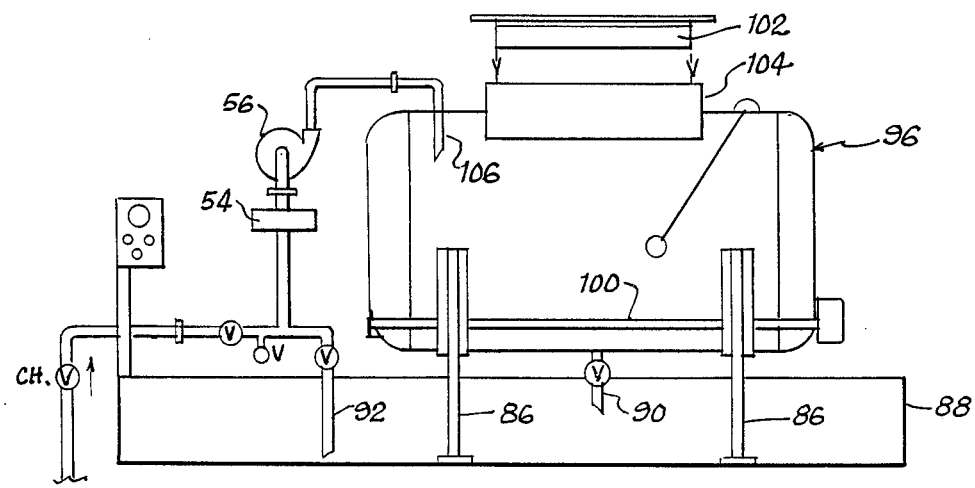
FIG. 7 is a diagrammatic view of a modification of the invention in which a cauldron boiler is used instead of a flash boiler.

Referring now to FIG. 7, this system is essentially the same as the system described in FIGS. 1 through 6 except that it utilizes a cauldron style boiler 98 instead of the flash-boil coil 58. This boiler has a heating element 100 which bubbles steam up through the water to be dissipated through the filter 102, which is shown elevated over its seat 104 atop the boiler. Introduction of water into the tank is achieved by the pipe 106, which draws water alternatively from the sump or the pan 88, as was the case in the first-mentioned embodiment.

Thus, when utilizing either of these recycling systems, there is no contaminant left to ship to a chemical dump. All the contaminants are accumulated in the charcoal filters. The charcoal filters could be periodically hauled to the chemical dump, or they themselves could be incinerated in an incinerator 108, diagrammatically illustrated in FIG. 1, alongside the fuel tank 110, which energizes the system burner. The incinerator would cause the activated charcoal filters to incinerate at a temperature sufficiently high to decompose any pesticide contaminants, or any other contaminants, which they would accumulate. Because the activated charcoal itself would burn completely, all chemical waste would have been suitably destroyed in this process.

Thus, the end result is, rather than requiring repeated and frequent trips at very high expense to the toxic waste dump, little or no toxic waste would be produced at all, and what little waste would be provided would accumulate and only occasionally require the efforts of the specially licensed toxic waste trucker, at an enormous savings.

I claim:

1. An apparatus for disposing of contaminated water washed from aircraft, vehicles and equipment comprising:

(a) a sump, and a sloped platform draining down into said sump, said platform comprising a washdown slab for washing down aircraft, vehicles and equipment;

(b) a boiler for converting contaminated water to steam;

(c) a steam chamber communicating with said boiler for receiving steam therefrom, said steam chamber including a stack with an opening defining a vent to atmosphere and a filter such that all steam from the boiler must pass through said filter before being vented to atmosphere;

(d) an intake line communicating between said sump and said boiler; and, (e) a filter interposed in said intake line to filter contaminates passed therethrough, and a pump operatively connected to said intake line to pump contaminated water from said sump to said boiler, whereby an airplane, vehicle or piece of equipment which has been exposed to contaminates can be parked on said platform and washed down, and the contaminated wash water can be conveniently cycled through said sump and intake line into said boiler where it is vaporized into steam, and the steam subsequently passed through the filter in said steam chamber as it is vented to atmosphere such that only clean steam is so vented.

2. Structure according to claim 1 wherein said boiler is energized by a burner and including a venting pipe which vents said burner to said steam chamber so that hot spent exhaust gases from said burner co-mingle with said steam to help maintain same in its gaseous state.

3. Structure according to claim 1 and including a condensated collection trough in said stack ducted to a specimen bottle to accumulate condensate specimens for periodic analysis of the quality of condensed steam in the stack.

4. Structure according to claim 1 wherein said sump is double-lined to define a pressurized hermetic chamber between the two linings thereof, and including a gas pressure gauge communicating with said chamber to monitor the gas pressure and thereby the integrity of the two linings of said sump.

5. Structure according to claim 4 and including a plurality of removal and cleanable screens of different mesh in said sump.

6. Structure according to claim 5 and including a water level sensor in said sump, said water level sensor being operatively connected to said pump and automatically actuated upon the ocurrence of a predetermined level water in said sump to operate said pump.

7. Subject matter according to claim 1 and including a condensed steam recycling system to collect water condensed from steam in said stack and recycle it through said boiler.

* * * * *